United States Patent
Muffoletto et al.

(10) Patent No.: US 6,659,283 B1
(45) Date of Patent: Dec. 9, 2003

(54) CAPACITOR GRADE POWDERS

(75) Inventors: Barry C. Muffoletto, Alden, NY (US); Ashish Shah, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 56 days.

(21) Appl. No.: 09/859,355

(22) Filed: May 17, 2001

(51) Int. Cl.⁷ .................. B03C 1/015; B03C 1/00; H01L 21/00

(52) U.S. Cl. ............ 209/12.1; 209/3; 209/214; 209/223.1; 209/223.2; 438/381

(58) Field of Search ............... 29/25.03, 623.1, 29/623.2, 623.3, 623.4, 623.5; 438/386–399, 381; 209/3, 214, 12.1, 223.1, 223.2

(56) References Cited

U.S. PATENT DOCUMENTS

| | | | |
|---|---|---|---|
| RE20,349 E | | 5/1937 | Hoke .................. 75/93 |
| 3,576,321 A | | 4/1971 | Faste ................. 266/36 |
| 3,881,915 A | | 5/1975 | Proler ................. 75/11 |
| 4,214,984 A | * | 7/1980 | MacElvain ......... 209/214 |
| 4,235,710 A | | 11/1980 | Sun ................... 209/213 |
| 4,295,881 A | | 10/1981 | Saville ................. 75/10 |
| 4,493,817 A | * | 1/1985 | Biss ................... 209/166 |
| 5,442,978 A | * | 8/1995 | Hildreth et al. ....... 75/363 |
| 6,041,942 A | * | 3/2000 | Goolsby .............. 209/214 |
| 6,323,055 B1 | * | 11/2001 | Rosenberg et al. ...... 438/77 |
| 6,391,084 B1 | * | 5/2002 | Ito et al. ............. 75/255 |

OTHER PUBLICATIONS

S.G. Frantz Company, Inc.; The Frantz Magnetic Barrier Laboratory Separator (Model LB–1); 5 pages, Aug. 1992.

* cited by examiner

Primary Examiner—Donald P. Walsh
Assistant Examiner—Daniel K Schlak
(74) Attorney, Agent, or Firm—Michael F. Scalise

(57) ABSTRACT

The present invention is directed to a method of purifying capacitor grade powders. The capacitor grade powder is initially placed into a purifying machine that disperses at least one contaminate into the capacitor grade powder. The powder is then placed into a magnetic separation device that separates at least one contaminate from the capacitor grade powder. The capacitor grade powder is then processed into an electrical energy storage device, wherein the capacitor grade powder has minimal contaminates therein.

19 Claims, 1 Drawing Sheet

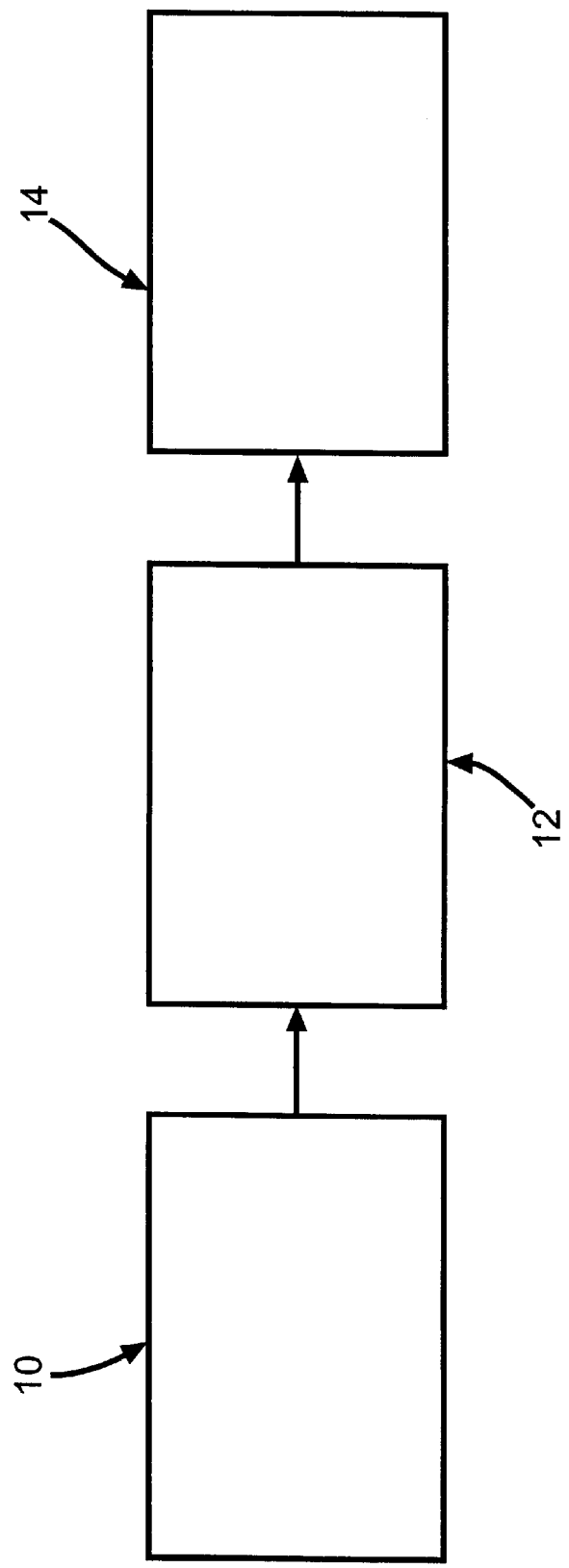

CAPACITOR GRADE POWDERS

FIELD OF THE INVENTION

The present invention relates to a process to purify capacitor grade powders to be used in an electrical energy storage device.

BACKGROUND OF THE INVENTION

Admittedly, an object to manufacture capacitor/battery grade powders, like tantalum, niobium, aluminum, zirconium, silver oxide, vanadium, magnesium dioxide, CFX, CuO, or any other conventional powder known to those skilled in the art, is to have them extremely purified. These powders, such as tantalum, are obtained from third parties, like H. C. Starck of Newton, Mass., and they require further purification if they are to be used as an electrical energy storage device, like a capacitor for implantable medical devices. A problem with this purification process is that the machines to purify these powders actually contaminate them. The powders are never 100% pure. The machines are normally made of various types of metal, and polymeric materials. As with any machine, wear and tear occurs and these machines shed contaminates into the powders.

If the contaminates are not removed from the powder, they become incorporated into the anode or cathode during the pressing phase. Once pressed into a pellet form, the contaminants generally melt during the sintering process which causes local areas of the pellet to be coated with the contaminants. These areas as a result cause sites of high dc leakage currents and are potential areas for breakdowns during the formation process.

An object of this invention is to avoid contaminates during the purification and manufacturing process of forming an anode and/or a cathode.

Sun in U.S. Pat. No. 4,235,710 discloses a method and apparatus for separating particles using a magnetic barrier. The magnetic barrier system of Sun separates a flowable mixture of particles in accordance with the magnetic susceptibilities of the particles. Likewise, MacElvain in U.S. Pat. No. 4,214,984 discloses an alternative magnetic barrier system.

Neither MacElvain nor Sun disclose separating capacitor grade powders within the purification or manufacturing processes as necessitated by the present invention. Instead, MacElvain uses a magnetic barrier system to separate types of conventional ores, and other metallic substances within his own machine. Likewise, Sun uses his system to separate particulates, like silicon carbide particles from diamond particles as described in Example 3, within his own machine.

As such, the applicants solved this problem of separating contaminates within a purification process of capacitor grade powders.

SUMMARY OF THE INVENTION

The present invention is directed to a method of purifying capacitor grade powders. The capacitor grade powder is initially placed into a purifying machine that normally disperses at least one contaminate into the capacitor grade powder. The powder is then placed into a magnetic separation device that separates the at least one contaminate from the capacitor grade powder. The capacitor grade powder is then processed into an electrical energy storage device, wherein the capacitor grade powder has minimal contaminates therein.

BRIEF DESCRIPTION OF THE DRAWINGS

A preferred embodiment of the present invention is described in detail hereinafter with reference to the accompanying drawings, in which:

FIG. 1 is a representative schematic of the present invention.

DETAILED DESCRIPTION OF THE PRESENT INVENTION

The elements set forth in FIG. 1 are conventional instruments used in combination to obtain a desired capacitor grade powder to be used in the electrical energy storage device industry, which includes capacitors and batteries. The elements of the present invention are a purifying machine 10 designed to remove contaminates from the capacitor grade powder, a Ax magnetic separator 12, and a processing device 14 that shapes the capacitor grade powder into the desired form for a capacitor unit (not shown). Admittedly, these elements 10, 12, and 14 are well known, but they have never been used in combination before.

Conventional wisdom indicates that the purifying machine 10, which can be and not limited to a Frantz Magnetic Barrier Laboratory Separator Model LB1, removes any and all contaminates from the capacitor grade powder. Unfortunately, such purification does not occur, because the purifying machine 10 itself drops contaminates into the capacitor grade powder. Such contaminates cause problems which are identified and discussed above to form non-pure powders.

To correct this problem in the electrical energy storage device industry, the inventors have inserted the magnetic separator 12 between the conventional purifying machine 10 and the processing machine 14. Magnetic separators disclosed in U.S. Pat. Nos. 4,235,710 and 4,214,984, which are hereby incorporated by reference, are representative samples of the magnetic separator 12 that can be used in the present invention. The magnetic separator 12 of the present invention ensures the capacitor/battery grade powder, which can be a tantalum, silver vanadium oxide, or other capacitor grade powder, as set forth above, has an extremely high purity content.

Hence, the extremely high purity capacitor grade powder is then placed into a processing machine 14, like a Dorst-Maschinen-und-Andagenbau, which puts the capacitor grade powder into the desired form to be used in the electrical energy storage device.

Although a particular preferred embodiment of the invention has been illustrated and described in detail for illustrative purposes, it will be recognized that variations or modifications of the disclosed apparatus, including the rearrangement of parts, lie within the scope of the invention defined by the claims.

The embodiments of the invention in which an exclusive property or privilege is claimed are defined as follows:

What is claimed is:

1. A method for purifying capacitor grade powders, comprising the steps of:
   a) placing a capacitor grade powder into a purifying machine that disperses at least one contaminate into the capacitor grade powder;
   b) moving the contaminated capacitor grade powder through a magnetic separation device comprising spaced apart pole pieces having their respective longitudinal axes aligned perpendicular to an intended travel direction of the capacitor grade powder, wherein the magnetic separation device establishes a nonuniform magnetic field between the pole pieces and along the travel direction, the nonuniform magnetic field providing a magnetic energy gradient having, in contiguous sequence, a katadynamic field region, an isodynamic field region, and an anadynamic field region, whereby the magnetic energy gradient along the travel direction is at a maximum at a locus of the isodynamic field region and decreases therefrom on either side thereof towards the katadynamic field region and towards the anadynamic field region, wherein the contaminated capacitor grade powder enters the magnetic energy gradient at either the katadynamic field region or the anadynamic field region and moves along the travel direction to exit the magnetic energy gradient at the other of the katadynamic field region or the anadynamic field region as a product capacitor grade powder having less contamination than the contaminated powder entering the magnetic separation device; and c) processing the product capacitor grade powder into an electrical energy storage device.

2. The method of claim 1 wherein the capacitor grade powder is either a tantalum powder or silver vanadium oxide.

3. The method of claim 1 wherein the purifying machine raises the purity of the capacitor grade powder.

4. The method of claim 1 wherein the magnetic field is established such that in a transversely extending region thereof, the magnitude of the magnetic energy gradient in the direction of the field is small relative to the magnitude of the magnetic energy gradient along the travel direction; and the contaminated capacitor grade powder is fed into the magnetic field within the region where the magnetic energy gradient in the travel direction is relatively small.

5. The method of claim 1 wherein the isodynamic field region in the travel direction is small relative to either the adjoining anadynamic field region or the adjoining katadynamic field region.

6. A method for purifying capacitor grade powders, comprising the steps of:

a) placing a capacitor grade powder into a purifying machine that disperses at least one contaminate into the capacitor grade powder, wherein one of the capacitor grade powder and the contaminate is a relatively more magnetic material and the other of them is a relatively less magnetic material;

b) moving, by means of a nonmagnetic force traveling in a force direction, the contaminated capacitor grade powder through a magnetic separation device comprising a plurality of magnetic structures, each having a surface aligned along a first plane, the magnetic structures providing a plurality of regions, each of which comprises a relatively stronger magnetic field and a relatively weaker magnetic field, wherein the magnetic structures are arranged such that a relatively stronger magnetic field is adjacent to a relatively weaker magnetic field having a width of at least 0.05 times the width of the stronger magnetic field, and wherein the magnetic structures are arranged such that their respective longitudinal axes are aligned at an angle of other than 90° in the first plane relative to the force direction of the nonmagnetic force, and wherein the capacitor grade powder and the contaminant move in substantially a second plane spaced from the first plane as they travel under the influence of the nonmagnetic force through the alternating relatively stronger magnetic fields and the relatively weaker magnetic fields of the plurality of magnetic structures to thereby separate them from each other and provide a product capacitor grade powder having less contamination than the contaminated powder entering the magnetic separation device; and c) processing the product capacitor grade powder into an electrical energy storage device.

7. The method of claim 6 wherein the capacitor grade powder is either a tantalum powder or silver vanadium oxide.

8. The method of claim 6 wherein the purifying machine raises the purity of the capacitor grade powder.

9. The method of claim 6 wherein each region is aligned from 0° to about 30° with respect to each adjacent region.

10. The method of claim 6 wherein edges of adjacent magnetic structures are of opposite polarity.

11. The method of claim 6 wherein the width of the relatively stronger magnetic field is from about 0.01 microns to about 10 centimeters.

12. The method of claim 6 wherein the magnetic regions are aligned in a horizontal pattern.

13. The method of claim 6 wherein the magnetic regions are aligned in a herringbone pattern.

14. The method of claim 6 wherein the magnetic regions are arranged in a sinusoidal pattern.

15. The method of claim 6 wherein the magnetic regions are arranged in a diagonal pattern with respect to the force direction of the nonmagnetic force.

16. The method of claim 6 wherein the magnetic regions are aligned at an angle of ±85° in the first plane with respect to the force direction of the nonmagnetic force.

17. The method of claim 6 wherein the plurality of magnetic regions is at least about 8 regions.

18. The method of claim 6 wherein the contaminated capacitor grade powder is subjected to the plurality of magnetic regions for at least about 0.05 seconds.

19. The method of claim 6 wherein the width of the relatively weaker magnetic field is from at least about 0.5 to about 2 times the width of its adjacent stronger magnetic field.

* * * * *